United States Patent [19]

Kitts

[11] Patent Number: 4,998,023

[45] Date of Patent: Mar. 5, 1991

[54] PORTABLE UTILITY CART

[75] Inventor: Keith D. Kitts, Elk Grove Village, Ill.

[73] Assignee: Lakeside Manufacturing, Inc., Milwaukee, Wis.

[21] Appl. No.: 369,845

[22] Filed: Jun. 22, 1989

[51] Int. Cl.⁵ .................................... B62B 3/02
[52] U.S. Cl. ........................ 280/47.35; 280/79.3; 211/126; 211/188; 248/129; 312/108
[58] Field of Search ............... 280/35, 47.34, 47.35, 280/79.3; 211/126, 186, 188, 194; 248/129, 150, 165, 221.4; 312/108

[56] References Cited

U.S. PATENT DOCUMENTS

| | | | |
|---|---|---|---|
| 3,844,577 | 10/1974 | Wahl | 280/47.35 X |
| 4,574,709 | 3/1986 | Lackey et al. | 211/186 X |
| 4,595,107 | 6/1986 | Welsch | 280/47.35 X |
| 4,620,637 | 11/1986 | Karashima | 280/47.35 X |
| 4,653,651 | 3/1987 | Flum | 211/188 X |
| 4,681,378 | 7/1987 | Hellman, III | 211/188 X |
| 4,743,040 | 5/1988 | Breveglieri et al. | 200/47.35 X |
| 4,781,644 | 11/1988 | Yoshida | 211/186 X |
| 4,843,975 | 7/1989 | Welsch et al. | 211/188 X |

FOREIGN PATENT DOCUMENTS

929048 6/1963 United Kingdom ............... 211/188

Primary Examiner—Charles A. Marmor
Assistant Examiner—Brian L. Johnson
Attorney, Agent, or Firm—Michael D. Rechtin; Philip P. Mann

[57] ABSTRACT

A portable utility cart having a number of blow molded shelf members, supports on corner post members, wheel connector members and wheel members. A slip sleeve and bayonet hook assembly interconnect the various pieces thereby making the assembly of the cart simple and expedient. The portable utility cart has no small loose pieces which can be lost or misplaced during shipment or assembly. The assembly of the cart, therefore, requires no tools.

16 Claims, 4 Drawing Sheets

PORTABLE UTILITY CART

BACKGROUND OF THE INVENTION

This invention relates generally to portable utility carts and is particularly concerned with utility carts fabricated from connectable pieces of plastic having blow molded shelf members. A slip sleeve and bayonet hook assembly is used for connecting the pieces together which makes assembly of the cart simple and expedient.

Because of economic and space considerations, it has become general practice, especially in the area of consumer products, to ship and sell products consisting of multiple pieces in an unassembled condition. Although this theoretically saves money for the retailer and consumer, it also means that the consumer is left with the laborsome chore of putting the product together. Confusing directions, along with the need to use numerous nuts and bolts, makes this a complicated process. Worse still is the case where the consumer is without mechanical aptitude or sufficient tools to perform the assembly. Such problems exist in the area of portable utility carts which typically are supplied to consumers and commercial users in an unassembled condition in order to minimize storage requirements during shipping and warehousing and to reduce labor costs. Since assembly is performed by the purchaser, it is desirable to provide a structure which can easily be assembled with a minimum of effort. Utility carts known in the art which require assembly are comprised of dozens of individual pieces which first must be identified, sorted and then assembled in a lengthy, multi-step process. In addition to this complicated procedure, there is the likelihood that some pieces may be lost, especially the numerous fasteners such as nuts, bolts, washers and pins. There is, therefore, a need for a portable utility cart which is well constructed, comprises a minimum number of parts and can be assembled quickly and easily with a minimum of effort.

SUMMARY OF THE INVENTION

Accordingly, it is an object of the present invention to provide a portable utility cart having a relatively small number of parts and which can be assembled quickly and easily with a minimum of effort.

It is further object of the present invention to provide a portable utility cart which is stable and ruggedly constructed so that it can withstand rough use and handling.

It is an additional object of the present invention to provide a portable utility cart which is suitable for commercial or personal use.

It is another object of the present invention to provide a portable utility cart which can easily be shipped in an unassembled condition.

It is a further object of the present invention to provide a portable utility cart which can be assembled without the use of tools.

It is an additional object of the present invention to obtain such a desirable portable utility cart construction in an economical and highly efficient method of manufacture.

To this end, the present invention provides a portable utility cart which is constructed of plastic and is comprised of blow molded shelf members, corner post members, wheel connector members, post cap members and wheels. The corner post members have connecting means for attachment to other corner post members, to wheel connector members, to post cap members and to blow molded shelf members. The connecting means comprises a slip sleeve integral with one end of the corner post member and a tapered arm integral with the opposite end of the corner post member which is sized for telescopic interconnection with one or more of the group above. The portable utility cart can comprise any number of shelf members which are interconnected and supported by the corner post members. As such, there are no loose pieces used to make the various interconnections other than the body components of the cart. Therefore, assembly can be accomplished very quickly and easily and without the possibility of losing or misplacing any small parts and without requiring any tools. The cart also is constructed of a minimum number of parts, thereby greatly reducing manufacturing costs.

Other objects, features and advantages of the prevent invention will be readily apparent from the following description of a representative embodiment thereof, taken in conjunction with the accompanying drawings, although variations and modifications may be effected without departing from the spirit and scope of the novel concepts embodied in the disclosure.

DETAILED DESCRIPTION OF THE PREFERRED EMBODIMENT

Figure 1:
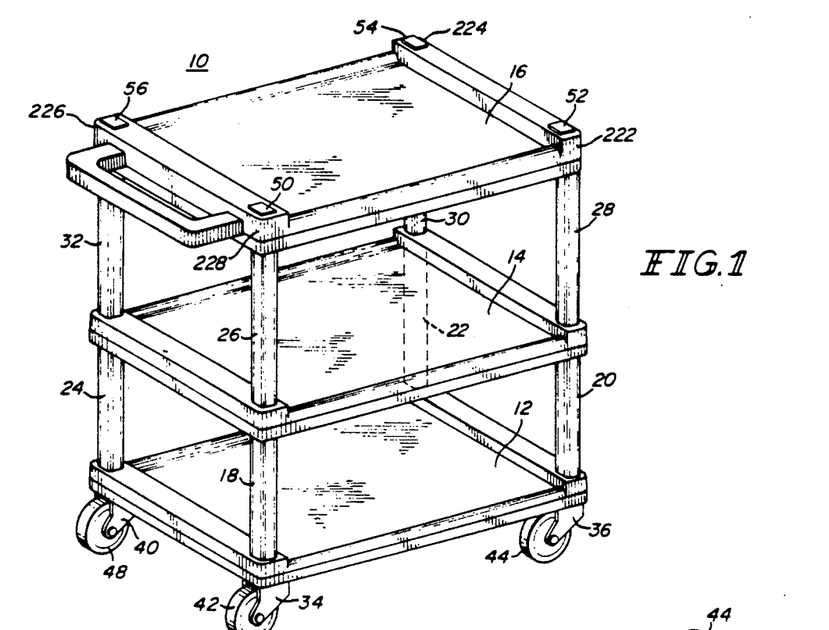
FIG. 1 is a perspective view showing an assembled portable utility cart embodying the present invention.

Reference is made to FIG. 1 which illustrates a portable utility cart 10 in an assembled condition. The portable utility cart 10 consists of a relatively small number of pieces and is designed to make assembly quick and easy. The portable utility cart 10 is comprised of first 12, second 14 and third 16 blow molded shelf members. Corner post members 18, 20, 22 (in phantom) and 24 are vertically arranged between and coupling the shelf members 12 and 14 at their respective corners. Similarly, the corner post members 26, 28, 30 and 32 are vertically arranged between and coupling the shelf members 14 and 16 at their respective corners. Wheel connector members 34, 36, 38 and 40 are arranged at the corners on the underside of the shelf member 12 and interconnect with the corner post members 18, 20, 22 and 24, respectively, within the corners of the shelf member 12. This interconnection will be described in detail below when the assembly of the portable utility cart 10 is described.

Figure 2:
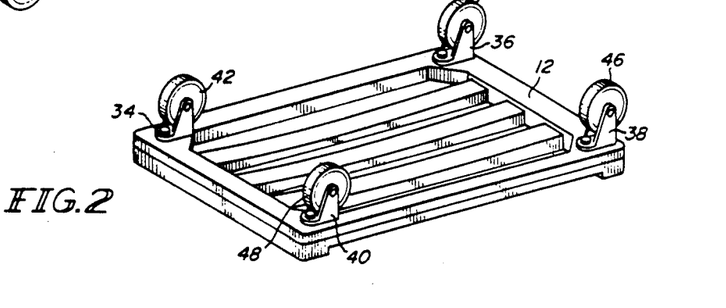
FIG. 2 is a perspective view of the bottom shelf member of FIG. 1 embodying the present invention.
Figure 13:
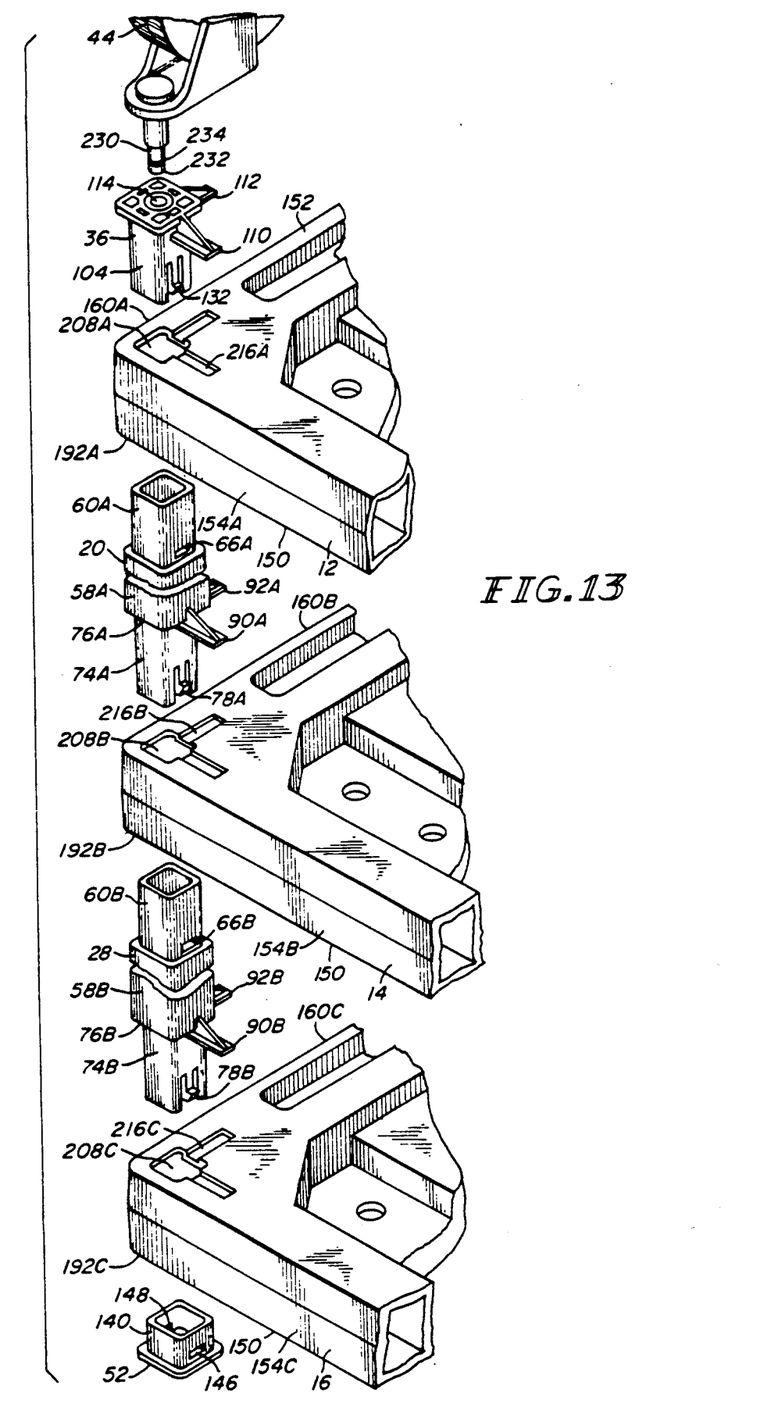
FIG. 13 is an exploded view of one corner of the utility cart of FIG. 1 illustrating the assembly process embodying the present invention.

Wheel members 42, 44, 46 and 48 are interconnected with the wheel connector members 34, 36, 38 and 40, respectively, as illustrated in FIGS. 2 and 13. This interconnection feature will also be described in detail below. Post cap members 50, 52, 54 and 56 are arranged at the corners on the top side of the shelf member 16 and interconnect with the corner post members 26, 28, 30 and 32, respectively, within the shelf member 16. A description of the interconnection of parts as described above will be more clearly understood after the structures of the various parts has been more fully described hereinafter.

Figure 3:
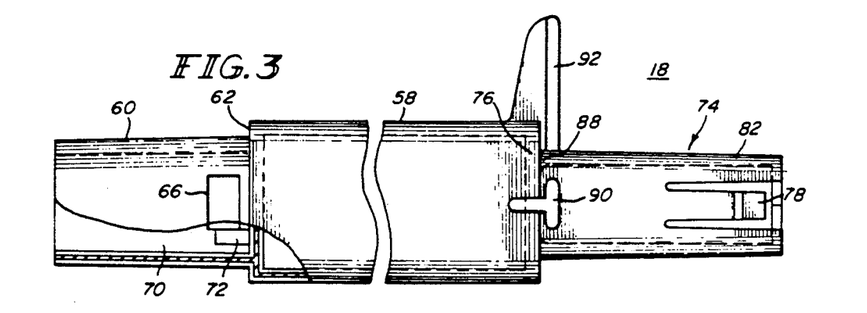
FIG. 3 is a side view of a typical corner post member embodying the present invention.
Figures 4, 5, 6, 7, 8:
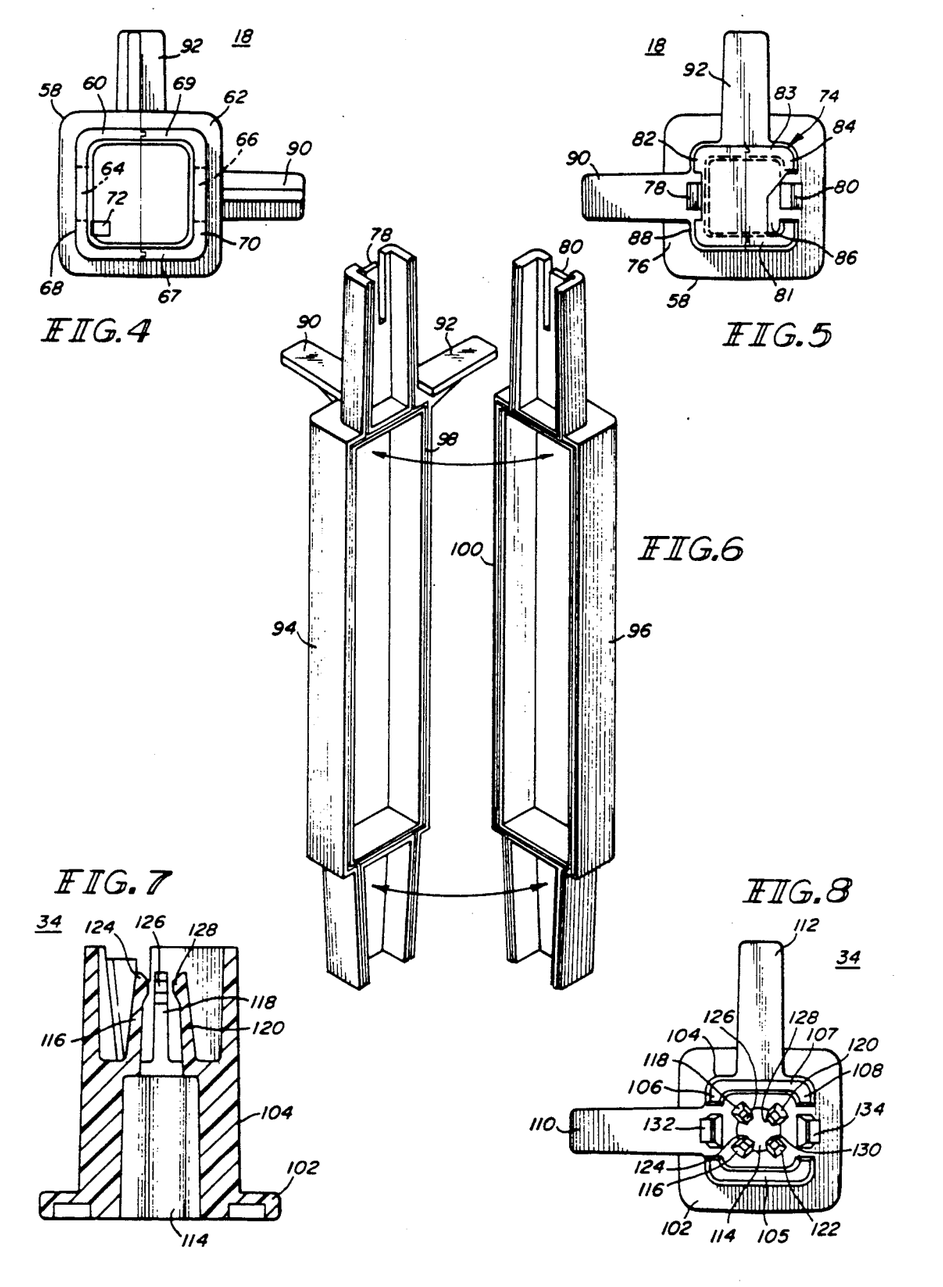
FIG. 4 is a top view of the first end of the corner post member of FIG. 3 embodying the present invention.
FIG. 5 is a bottom view of the corner post member of FIG. 3 embodying the present invention.
FIG. 6 is an exploded perspective view of the corner post member of FIG. 3 illustrating the two pieces from which the corner post member is formed prior to their being bonded together.
FIG. 7 is a vertical sectional view of a typical wheel connector member embodying the present invention.
FIG. 8 is a top view of a typical wheel connector member embodying the present invention.

The corner post members 18, 20, 22, 24, 26, 28, 30 and 32 are illustrated in FIGS. 3, 4 and 5. Each of the corner post members have the identical structure and are, therefore, interchangeable. Any of the corner post members 18, 20, 22, 24, 26, 28, 30 and 32 can thus be arranged at any of the corner post locations. This is also a desirable feature in that all of the corner post members can be manufactured from the same mold, thereby sizably reducing the manufacturing cost of the utility cart 10. Due to the identical nature of the corner post members in the preferred embodiment, only the corner post member 18 will be described in detail.

In a preferred embodiment, the body 58 of the corner post member 18 is constructed of square plastic tubing. As illustrated in FIG. 4, a slip sleeve 60 is formed integrally with a first end 62 of the corner post member 18. It is also anticipated that the slip sleeve 60 may be separately formed and attached to the body 58 by such suitable means as glueing. The slip sleeve 60 has a first slotted opening 64 on one of its sides 68. A second slotted opening 66 is located directly across from the first slotted opening 64 and formed on side 70 of the slip sleeve 60. The slip sleeve 60 also has a projection 72 which extends outwardly from the interior of side wall 68.

As illustrated in FIGS. 3 and 5, a tapered arm 74 is formed integrally with a second end 76 of the corner post member 18. It is also anticipated that the tapered arm 74 can be separately formed and attached to the body 58 by such suitable means as glueing. The tapered arm 74 has a first bayonet hook 78, formed on side 82, and a second bayonet hook 80 located directly across from the first bayonet hook 78 and formed on side 84. A receptor 86 is formed in the upper portion of the tapered arm 74, adjacent to the bayonet hook 80 on side 84 of the tapered arm 74. Located proximate to base 88 of the tapered arm 74, at the second end 76 of the corner post member 18, is a first support flange 90 and a second support flange 92. The first support flange 90 is horizontally centered on the side 82 of the tapered arm 74 and extends outwardly therefrom. A second support flange 92 is horizontally centered on side 83 of the tapered arm 74 and extends outwardly therefrom.

In a preferred embodiment, the corner post members 18, 20, 22, 24, 26, 28, 30 and 32 are comprised of a first piece 94 and a second piece 96, as illustrated in FIG. 6.

The first piece 94 and second piece 96 are preferably molded from plastic. However, other durable materials such as metal can also be used. The first corner post member piece 94 has a groove 98 extending around its perimeter, and the second corner post member piece 96 has a corresponding tongue 100 extending around its perimeter. The groove 98 of the first piece 94 and the tongue 100 of the second piece 96 are in correspondence such that when the pieces 94 and 96 are brought together, the tongue 100 snaps into the groove 98, thereby forming one solid corner post member 18, 20, 22, 24, 26, 28, 30 or 32. The first corner post member piece 94 and the second corner post member piece 96 can be glued or epoxied between the groove 98 and the tongue 100, thereby forming a more permanent bond. In alternative embodiments, the corner post member pieces 94 and 96 can be fused together, Alternatively, the corner post members 18, 20, 22, 24, 26, 28, 30 and 32 can be molded or otherwise constructed from one single piece or any number of pieces which would result in a structurally durable and rugged member.

The wheel connector members 34, 36, 38 and 40 will now be described in detail. For simplicity sake only reference to the wheel connector member 34 will be made since the wheel connector members 34, 36, 38 and 40 preferably all have an identical structure. As illustrated in FIGS. 7 and 8, the wheel connector member 34 comprises a base 102 having a tapered arm 104 which extends upwardly from the base 102. The tapered arm 104 has four sides 105, 106, 107 and 108. Located proximate to the base 102 of the wheel connector member 34 is a first support flange 110 and a second support flange 112. The first support flange 110 is horizontally centered on the side 106 of the tapered arm 104 and extends outwardly from the side 106. Similarly, a second support flange 112 is horizontally centered on the side 107 of the tapered arm 104 and extends outwardly from the side 107. A cylindrical shaft 114 extends upwardly through the center of the wheel connection member 34. Above the cylindrical shaft 114 are fingers 116, 118, 120 and 122, circularly arranged and facing toward each other pairwise. At the tops of the fingers 116, 118, 120 and 122 are disposed projecting keys 124, 126, 128 and 130, respectively. The tapered arm 104 also includes a first bayonet hook 132 formed on the side 106 and a second bayonet hook 134 located directly across from the first bayonet hook 132 and formed on the side 108. A receptor 136 is formed on the upper portion of the tapered arm 104 adjacent to bayonet hook 134 on the side 108 of the tapered arm 104.

In a preferred embodiment, the wheel members 34, 36, 38 and 40 are constructed of a single piece of molded plastic. However, it is anticipated that the wheel connector members 34, 36, 38 and 40 can be constructed of multiple pieces of molded plastic or other materials, such as metal or rubber.

Figure 9:
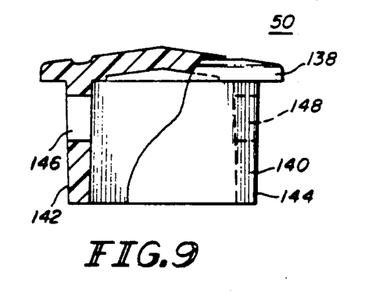
FIG. 9 is a side view, partially cut away of a typical post cap member embodying the present invention.
Figure 10:
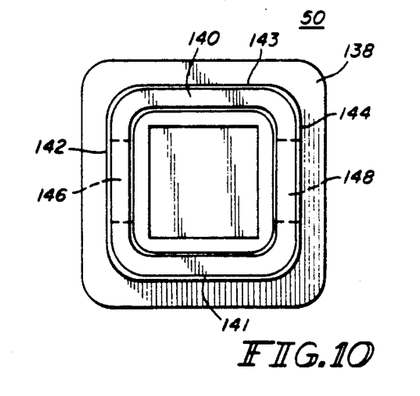
FIG. 10 is a bottom view of a typical post cap member embodying the present invention.

The post cap members 50, 52, 54 and 56 will now be described in detail. For simplicity sake only, reference to the post cap member 50 will be made since the post cap members 50, 52, 54 and 56 all preferably have an identical structure. As illustrated in FIGS. 9 and 10, the post cap member 50 comprises a top 138 having a slip sleeve 140 formed integrally with the top 138. In an alternative embodiment, the slip sleeve 140 can be glued or otherwise attached to the top 138. The slip sleeve 140 has four sides 141, 142, 143 and 144. The slip sleeve 140 has a first slotted opening 146 formed on the side 142 and a second slotted opening 148 formed on side 144 and located directly across from the first slotted opening 146. In a preferred embodiment, the post cap members 50, 52, 54 and 56 are single pieces molded from plastic. However, it is anticipated that the post cap members 50, 52, 54 and 56 can be constructed of multiple pieces of molded plastic or similarly rugged materials, such as metal.

Figure 11:
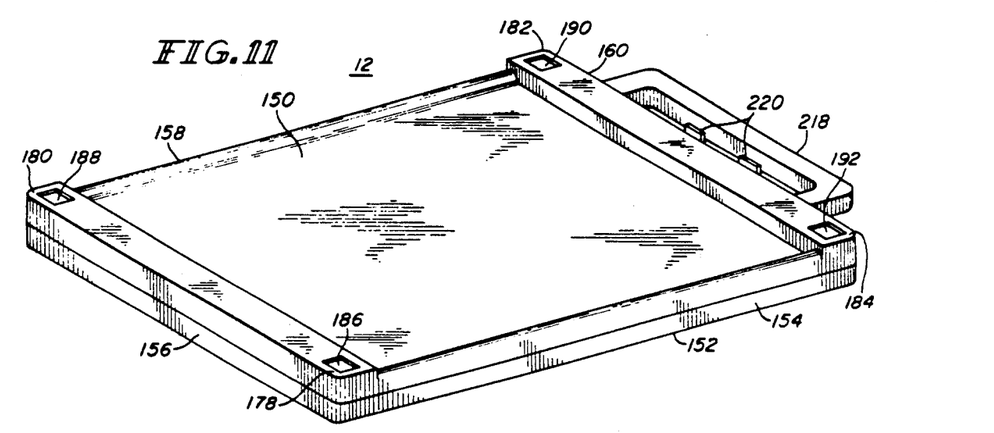
FIG. 11 is a perspective view of a typical shelf member embodying the present invention.
Figure 12:
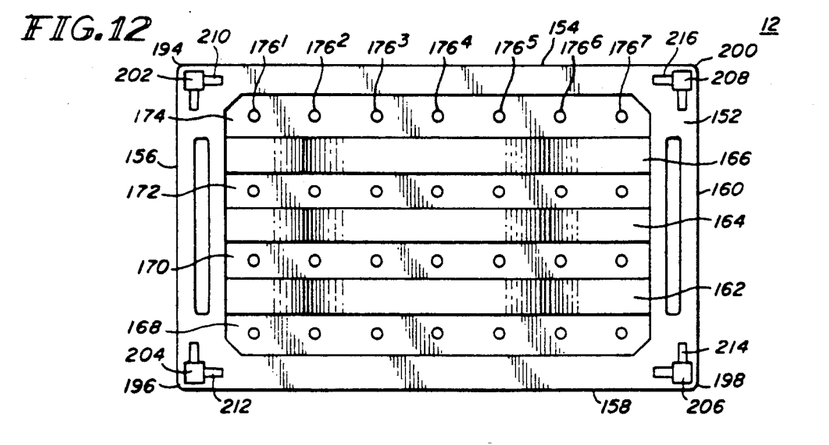
FIG. 12 is a bottom view of the typical shelf member of FIG. 11 embodying the present invention.

Shelf members 12, 14 and 16 will now be described in detail. Again, for simplicity sake only, reference only to the shelf member 12 will be made since the shelf members 12, 14 and 16 all preferably have an identical structure. As illustrated in FIGS. 11 and 12, the shelf member 12 is constructed of a single piece of blow molded plastic and is substantially hollow. Prior to the present invention it was not previously known in the art to construct shelves for carts by the process of blow molding because the shelf 12 requires projections which blow molding cannot ordinarily produce. However, due to the snap lock construction which will be described in detail below, the need for such projections is avoided. The shelf member 12 has a top 150, a bottom 152 and four sides 154, 156, 158 and 160. The bottom 152 of the shelf member 12 comprises a series of arches 162, 164 and 166 and cavities 168, 170, 172 and 174. The arches and cavities are in an alternating sequence such that: the cavity 168 is adjacent to the arch 162; in turn the arch 162 is adjacent to the cavity 170 which is adjacent to arch 164; and the arch 164 is adjacent to the cavity 172 which is adjacent to the arch 166; and the arch 166 is adjacent to cavity 174. This alternating sequence of arches and cavities provides enhanced support strength and structural integrity to the shelf member 12.

Within the cavities 168, 170, 172 and 174 are rows of dimples $176^1$ through $176^7$. The dimples $176^1$ through $176^7$ are arranged such that they come in contact with the undersurface of the top 150 of the shelf member 12. The dimples $176^1$ to $176^7$ further increase the support strength of the shelf member 12. On the top side 150 of the shelf member 12 at corners 178, 180, 182 and 184, there are openings 186, 188, 190 and 192, respectively. On the bottom side 152 of the shelf member 12 at corresponding corners 194, 196, 198 and 200, there are also openings 202, 204, 206 and 208, respectively, which are aligned directly below and share the same center line as the corresponding top openings 186, 188, 190 and 192, respectively. Slot pairs 210, 212, 214 and 216 extend outward from the openings 202, 204, 206 and 208, respectively, and are parallel with the sides 154, 156, 158 and 160.

The sides 156, 158 and 160 are raised above the top surface 150 of the shelf member 12 in order to provide added structural support to the shelf member 12. This also prevents objects placed on the top 150 of the shelf 12 from sliding off. The side 154 of the shelf member 12 is only slightly raised above the top 150 which allows objects placed on the top 150 to be easily removed therefrom, yet will also prevent objects from falling off. The top 150 may further have a textured surface so as to prevent objects from sliding around. The shelf member 12 can further include a handle member 218 which allows the user to pull or push or otherwise manipulate the utility cart 10, thereby increasing its mobility. The shelf member 12 can also have one or more tabs 220 from which various objects such as tools, waste bags, etc. may be attached, hung or otherwise supported.

As stated earlier, the portable utility cart 10 has been constructed with the purpose of making assembly swift and easy without the use of tools. As illustrated in FIG. 1, the assembled portable utility cart 10 has four corners 222, 224, 226 and 228. The assembly of the portable utility cart 10 will be described only in relation to the corner 228 in that the assembly of the remaining corners 222, 224 and 226 is preferably identical. FIG. 13 illustrates how the various parts are assembled. Like parts will bear the same number but will be differentiated by a letter designation following the number.

STEP ONE

The post 230 of the wheel member 44 is inserted into the cylindrical shaft 114 of the wheel connector member 36. As the post 230 of the wheel member 44 is further inserted through the cylindrical shaft 114 of the wheel connector member 36, the top 232 of the post 230 comes in contact with the fingers 116, 118, 120 and 122 of the wheel connector member 36. Further insertion of the wheel member 44 will cause the fingers 116, 118, 120 and 122 to bend away from the center of the post 230.

The post 230 has a recess 234 near the top 232. As the top 232 of the post 230 pushes the fingers 116, 118, 120 and 122 away from the center of the post 230, the projecting keys 124, 126, 128 and 130, associated respectively to fingers 116, 118, 120 and 122, snap back into the recess 234, thereby locking the wheel member 44 in place.

STEP TWO

The slip sleeve 60A of the corner post member 20 is inserted into the opening 192A on the top side 150 of the shelf member 12. The corner post member 20 must be inserted in the opening 192A with the proper orientation. The support flanges 90A and 92A which are located at the second end 76A of the corner post member 20 must be facing inward and parallel to the sides 154A and 160A of the shelf member 12. Similarly, the tapered arm 104 of the wheel connector member 36 having the wheel 44 inserted therein is inserted into the opening 208A on the bottom side 152 of the shelf member 12. The wheel connector member 36 must likewise be properly oriented such that the support flanges 110 and 112 face inwardly and are parallel with the sides 154A and 160A. The tapered arm 104 will slide into the slip sleeve 60A of the corner post member 20 within the shelf member 12. The bayonet hooks 132 and 134 are resiliently structured such that they bend inward and toward each other as the tapered arm 104 enters the slip sleeve 60A. As the tapered arm 104 of the wheel connector member 36 is slid further into the slip sleeve 60A, the bayonet hooks 132 and 134 reach the slotted openings 64A and 66A, respectively. The bayonet hooks 132 and 134 snap back to their normal positions, respectively, thereby latching into the slotted openings 64A and 66A. This creates a positive interconnection between the wheel connector member 36, the shelf member 12 and the corner post member 20. When fully inserted and locked in position, the support flanges 110 and 112 of the wheel connector member 36 will be resting within the slots 216A. The support flanges 110 and 112 provide support to the shelf member 12 by increasing the surface area on which the shelf member 12 rests. The slot pair 216A holds the support flanges 110 and 112 securely in place, thereby increasing the stability of the portable utility cart 10 by preventing the wheel connector member 36 from twisting.

To further ease the assembly process of the portable utility cart 10, the small projection 72A extends inwardly from the interior of the side wall 68A of the slip sleeve 60A. This projection 72A corresponds with the receptor 136 which is formed in the upper portion of the tapered arm 104. As the tapered arm 104 is slid into the slip sleeve 60A, the projection 72A fits into the receptor 136 when the slip sleeve 60A and the wheel connector member 36 are properly oriented. If either the slip sleeve 60A or the wheel connector member 36 are not properly oriented, the projection 72A will prohibit further sliding of the wheel connector member 36 into the slip sleeve 60A. This prevents the bayonet hooks 132 and 134 from locking into the slotted openings 64A and 66A. Since the bayonet hooks 132 and 134 would not be locked into the slotted openings 64A and 66A, one may merely remove the wheel connector 36 from the slip sleeve 60A and reinsert the same in the proper orientation.

STEP THREE

The next step in the assembly process is to place the shelf member 14 over the tapered arm 74A of the corner post member 20 through the opening 208B. The shelf member 14 will thereby be resting on the support flanges 90A and 92A with the support flanges 90A and 92A being within the slot 216B. The support flanges 90A and 92A provide a broader surface area to support the shelf member 14 and further prevent the shelf member 14 from twisting. In a preferred embodiment the slip sleeve 60B of the corner post member 28 is inserted in the opening 192B of the shelf member 14 and over the tapered arm 74A of the corner post member 20. The slip sleeve 60B of the corner post member 28 has a projection 72B, and the tapered arm 74 has the receptor 86A which assures proper orientation. The bayonet hooks 78A and 80A of the tapered arm 74A bend backward and toward each other as the slip sleeve 60B of the corner post member 28 is slid over the top of the tapered arm 74A. As the slip sleeve 60B of the corner post member 28 is further slid over the tapered arm 74A, the bayonet hooks 78A and 80A reach the slotted openings 64B and 66B of the slip sleeve 60B, respectively. The bayonet hooks 78A and 80A then snap into the slotted openings 64B and 66B, respectively, thereby locking the corner post member 28, the shelf member 14 and the corner post member 20 securely in place.

STEP FOUR

The next step in the assembly process is to place the shelf member 16 over the tapered arm 74B of the corner most member 28 through the opening 208C. The shelf member 16 will thereby be resting on the support flanges 90B and 92B with the support flanges 90B and 92B being within the slot 216C. This provides support to the shelf member 16 and antitwisting strength to the portable utility cart 10. The slip sleeve 140 of the post cap member 52 is inserted through the opening 192C of the shelf member 16, and over the top of the tapered arm 74B of the corner post member 28. The post cap member 52 must be inserted in the proper orientation such that the slotted openings 146 and 148 will correspond with the bayonet hooks 78B and 80B, respectively, of the tapered arm 74B. As the slip sleeve 140 is inserted over the tapered arm 74B, the bayonet hooks 78B and 80B reach the slotted openings 146 and 148. The bayonet hooks 78B and 80B then snap into the slotted openings 146 and 148 thereby interlocking the post cap member 52 with the shelf member 16 and the corner post member 28.

In an alternative embodiment, step three may be repeated a plurality of times such that there may be a plurality of shelf members. Step three can also be deleted in which case the post cap member 52 is inserted directly into the opening 192B of the shelf member 14. This would result in a portable utility cart having only two shelves. It is also anticipated that the corner post members 18, 20, 22, 24, 26, 28, 30 and 32 can be constructed of varying lengths, thereby increasing or decreasing the distance between the shelves.

It is noted that in a preferred embodiment, the portable utility cart 10 is constructed of plastic. However, it is realized that other suitable material known in the art can be utilized as well. In the preferred embodiment, the shelf members 12, 14 and 16 are constructed of high density, abuse-resistant, polyethylene impact grade plastic which is one of the toughest molding grades. Polyethylene offers high impact and tensile properties. The corner post members 18, 20, 22, 24, 26, 28, 30 and 32; the wheel connections 34, 36, 38 and 40; and the post cap members 50, 52, 54 and 56 are all constructed of high impact ABS plastic. The construction and materials used result in the portable utility cart 10 having increased structural integrity. The high density plastics used also prevent staining and unsanitary conditions. The construction described above resists formation of cracks and crevices where bacteria or other foreign matter may collect. It will be understood that other variations and modifications of the invention can be effected without departing from the spirit and scope of the novel concepts of this invention.

I claim as my invention:

1. A portable utility cart comprising:
   a plurality of blow molded shelf members having a plurality of corners, said shelf members having openings proximate to each of their corners;
   a plurality of corner post members arranged between said shelf members;
   a plurality of wheel connector members each attached to a first end of a respective one of said corner post members;
   a plurality of wheel members each attached to a respective one of said wheel connector members so as to allow rolling of said cart;
   a plurality of post cap members each attached to a respective one of said corner post members at a second end thereof;
   said corner post members having connecting means for attachment to at least one of a group comprising a second one of said corner post members, said wheel connector members, said post cap members and said blow molded shelf members;
   said connecting means comprising a slip sleeve at said first end of said corner post members and a tapered arm at said second end of said corner post members and sized for telescopic interconnection with at least one of said group; and said connecting means further including slotted openings oppositely disposed on two sides of said slip sleeves of said first end of said corner post members and two pressure sensitive bayonet hooks oppositely disposed and integral with two corresponding sides of said tapered arm of said second end of said post members whereby said second ends of said post members can be inserted into said first ends of another of said corner post members for telescopic interconnection therebetween so that said pressure sensitive bayonet hooks latch into said slotted openings of said first ends of said corner post members, thereby creating a positive connection therebetween; and said openings in said shelf members being sized for reception of said slip sleeves and said tapered arms so as to provide for swift and easy assembly of said portable utility cart.

2. A utility cart as described in claim 1, wherein said wheel connector members comprise:

a base having a tapered arm integral therewith and upwardly extending therefrom and further having two support flanges extending outwardly from said base and said tapered arm in co-planar orientation substantially at 90 degrees to each other; and said flange members providing support for said shelf members at each of said corners, said wheel connector members further comprising a cylindrical shaft extending upwardly through the center of said wheel connector member for insertion of said wheel members and having a plurality of fingers circularly arranged above said shaft for locking said wheel member in place, said wheel connector members further comprising two pressure sensitive bayonet hooks oppositely disposed on two sides of said tapered arm, said tapered arm being shaped for insertion into said first end of said corner Post member wherein said pressure sensitive bayonet hooks are constructed and arranged for resilient movement whereby said bayonet hooks snap into said slotted openings of said first end of said corner post members when said tapered arms of said wheel connector member are inserted into said first ends of said corner post members so as to create a positive lock therebetween within said openings of said shelf members.

3. A utility cart as described in claim 1, wherein said post cap members comprise:

a top having a slip sleeve integral therewith and downwardly extending therefrom and further having two slotted openings oppositely disposed in two sides of said slip sleeves, said slip sleeves being shaped for reception of said second ends of said corner post members, wherein said pressure sensitive bayonet hooks of said second ends of said corner post members snap into said slotted openings of said post cap members for creating a positive lock therebetween and wherein said reception occurs within said openings of said shelf members.

4. A utility cart as described in claim 1, wherein said corner post members further comprise:

two support flanges located proximate to the base of said tapered arms of said second ends of said post members and extending outwardly therefrom in a co-planar orientation and substantially at ninety degrees to each other; and said flange members providing support for said shelf members at each of said corners.

5. A utility cart as described in claim 1, wherein said corner post members further comprise:

a projecting member extending inwardly from the interior of a wall of said slip sleeves of said first ends of said corner post members; and corresponding receptor members in said tapered arms of said second ends of said corner post members for reception of said projecting members wherein said projecting members and said corresponding receptor members prohibit improper interconnection of one of said corner post members with another said corner post member.

6. A utility cart as described in claim 1, wherein said corner post members comprise two independent pieces molded from plastic, one of said pieces having a tongue extending along its perimeter and the second of said pieces having a corresponding groove extending along its perimeter, said pieces being bonded together with said tongue of said one piece inserted into said groove of said other piece, thereby forming a bond therebetween.

7. A utility cart as described in claim 1, wherein said shelf members comprising a top, a bottom, and four sides are constructed of a singular piece of blow molded plastic; said shelf members being substantially hollow.

8. A utility cart as described in claim 1, wherein said bottom of said shelf members further comprises:

slots arranged proximate to each of said corners and extending outwardly from said openings proximate to said corners at approximately ninety degrees for reception of said two support flanges at each respective one of said corners when said wheel support members are inserted in said opening of said shelf members so as to provide structural support and antitwisting strength to said cart.

9. A utility cart as described in claim 4, wherein the bottom of said shelf members further comprises:

slots arranged proximate to each of said corners and extending outwardly from said openings proximate to said corners at approximately ninety degrees for reception of said two support flanges at each respective one of said corners when said corner post member are inserted in said openings of said shelf members so as to Provide structural support and antitwisting strength to said cart.

10. A utility cart as described in claim 1, wherein said shelf members comprise a top, a bottom and four sides, and wherein at least one of said sides is raised above said top so as to prevent objects from falling from said top and to provide added structural support to said shelf members.

11. A utility cart as described in claim 1, wherein said topside is textured for increased gripping strength for preventing objects from sliding on said topside.

12. A utility cart as described in claim 1, wherein at least one of said shelf members further comprises a handle member for manual manipulation of said utility cart thereby enhancing the mobility of said utility cart.

13. A utility cart as described in claim 1, wherein at least one of said shelf members further comprises tabs from which various objects may be attached, hung or supported.

14. A utility cart as described in claim 1, wherein the elements of said cart are manually interconnectable so as to provide for swift and easy assembly without the use of tools.

15. A portable utility cart as described in claim 1, wherein said shelf members and corner post members have smooth surfaces adapted to reduce unsanitary and unsafe conditions.

16. A portable utility cart comprising:

a plurality of blow molded shelf corners having a plurality of corners, said shelf members having openings proximate to each of their corners, the bottom of at least one of said shelf members comprising a series of alternating arches and cavities and wherein rows of dimples form a grid type pattern within said cavities and said dimples come in contact with an undersurface of a topside of said shelf member, said alternating arches, cavities and dimples therein providing increased support strength and structural integrity to said shelf members, said shelf members having openings proximate to each of their corners;

a plurality of corner post members arranged between said shelf members;

a plurality of wheel connector members each attached to a first end of a respective one of said corner post members;

a plurality of wheel members each attached to a respective one of said wheel connector members so as to allow rolling of said cart;

a plurality of post cap members each attached to a respective one of said corner post members at a second end thereof;

said corner post members having connecting means for attachment to at least one of a group comprising a second one of said corner post members, said wheel connector members, said post cap members and said blow molded shelf members;

said connecting means comprising a slip sleeve at said first end of said corner post members and a tapered arm at said second end of said corner post members and sized for telescopic interconnection with at least one of said group and further including means for supporting said shelf members on said cart; and said openings in said shelf members being sized for reception of said slip sleeves and said tapered arms so as to provide for swift and easy assembly of said portable utility cart.

* * * * *